(12) United States Patent
Ovadia et al.

(10) Patent No.: US 11,249,749 B2
(45) Date of Patent: Feb. 15, 2022

(54) AUTOMATIC GENERATION OF CONFIGURATION FILES

(71) Applicant: Red Hat, Inc., Raleigh, NC (US)

(72) Inventors: Ido Ovadia, Raanana (IL); Boaz Shuster, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/830,698

(22) Filed: Mar. 26, 2020

(65) Prior Publication Data
US 2021/0303295 A1    Sep. 30, 2021

(51) Int. Cl.
*G06F 8/71* (2018.01)
*G06F 8/77* (2018.01)

(52) U.S. Cl.
CPC . *G06F 8/71* (2013.01); *G06F 8/77* (2013.01)

(58) Field of Classification Search
USPC .......................................................... 717/101
See application file for complete search history.

(56) References Cited

U.S. PATENT DOCUMENTS

| | | | |
|---|---|---|---|
| 10,375,121 B2 | 8/2019 | Hamou et al. | |
| 2005/0262471 A1* | 11/2005 | Wagner | G06F 8/20 717/101 |
| 2010/0242022 A1* | 9/2010 | Wagner | G06F 8/71 717/123 |
| 2017/0374106 A1* | 12/2017 | Hamou | H04L 63/0263 |
| 2019/0324767 A1* | 10/2019 | Stein | G06F 9/44505 |

FOREIGN PATENT DOCUMENTS

| | | |
|---|---|---|
| CN | 109086134 A | 12/2018 |
| CN | 109104317 A | 12/2018 |
| CN | 109324819 A | 2/2019 |
| CN | 109542970 A | 3/2019 |

OTHER PUBLICATIONS

De Alfonso, Carlos et al., "Container-based Virtual Elastic Clusters," Journal of Systems and Software, Jan. 2017, 35 pages.
Lai, Junyu et al., "Network Emulation as a Service (NEaaS): Towards a Cloud-Based Network Emulation Platform," SpringerLink, https://link.springer.com/article/10.1007/s11036-019-01426-0, Jan. 4, 2020, 14 pages.

* cited by examiner

*Primary Examiner* — John Q Chavis
(74) *Attorney, Agent, or Firm* — Withrow & Terranova, PLLC (57) ABSTRACT

A method includes receiving one or more project environment features of a project, identifying one or more relevant projects from a number of known projects by comparing the one or more project environment features of the project to one or more project environment features of each of the known projects, and generating at least a portion of a configuration file based on one or more configuration files from each of the one or more relevant projects. Identifying relevant projects from a number of known projects by comparing project environment features and subsequently using configuration files from the relevant projects to generate at least a portion of the configuration file allows for a robust configuration file to be created without effort on the part of a user.

20 Claims, 7 Drawing Sheets

AUTOMATIC GENERATION OF CONFIGURATION FILES

BACKGROUND

Configuration files are often used to define settings and operational characteristics of software projects and computing systems. For example, one or more configuration files may define how a software project should be built by a compiler and/or deployed. As another example, one or more configuration files may define the processes that should be run when a computing container is built and/or started. As another example, one or more configuration files may define one or more code modules that are used by a software project. Examples of configuration files include Makefiles, Dockerfiles, Python configuration files (e.g., Pipenv, requirements.txt), Node.js configuration files (e.g., packages.json), Ruby configuration files, Ansible configuration files and the like.

SUMMARY

In one example, a method includes receiving one or more project environment features of a project, identifying one or more relevant projects from a number of known projects by comparing the one or more project environment features of the project to one or more project environment features of each of the known projects, and generating at least a portion of a configuration file based on one or more configuration files from each of the one or more relevant projects. Identifying relevant projects from a number of known projects by comparing project environment features and subsequently using configuration files from the relevant projects to generate at least a portion of the configuration file allows for a robust configuration file to be created without effort on the part of a user.

The one or more project environment features may include one or more of a file structure of one or more files in the project, code in one or more source code files in the project, and the use of one or more code modules in one or more source code files in the project.

In one example, the configuration file comprises a Dockerfile, and the method further includes analyzing each of the known projects to extract the one or more project environment features therein and analyzing one or more Dockerfiles associated with each one of the known projects to extract one or more configuration settings therefrom. Generating at least the portion of the configuration file may include combining the one or more configuration settings from each of the relevant projects into the configuration file.

In one example, the one or more configuration settings include a number of configuration settings. The method may further include identifying one or more conflicts between at least two of the configuration settings and, in response to identifying a conflict, presenting a user interface allowing a user to choose between the conflicting configuration settings.

In various examples, the configuration file is a Makefile, a Dockerfile, a Python configuration file, a Node.js configuration file, a Ruby configuration file, and an Ansible configuration file.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Configuration files are typically manually generated by a user, such as a software developer. Generating a configuration file requires specialized knowledge regarding the format and syntax of the configuration file. Configuration files may have certain commands, instructions and/or parameters that are enterprise (i.e., company) dependent, such as where certain information is located, such as source code files or libraries, or where things may be stored. Configuration files in a large enterprise may also be written in a manner, that, over time, the enterprise has decided constitutes a best practice. For a relatively new individual tasked with generating such configuration files, there can be a time-consuming learning curve as the individual must first determine installation nuances, as well as what the institution determines are such best practices. Moreover, individual generation of such configuration files increases a likelihood of error. In addition, it is common that a complex configuration file developed for a first project environment must be modified for use with a second project environment. Performing such modifications can be very time-consuming and error prone.

The examples disclosed herein automatically generate configuration files, such as, by way of non-limiting example, Dockerfiles, by analyzing project environment features of an existing project, identifying relevant projects from a plurality of known projects based on the project environment features of the existing project, and, based on configuration files from each of the one or more relevant projects, generate at least a portion of a configuration file. The examples disclosed herein, among other advantages, facilitate rapid, reliable and consistent configuration files, such as Dockerfiles, based on existing Dockerfiles, which greatly reduces errors, decreases development time and ensures consistent Dockerfiles.

Figure 1:
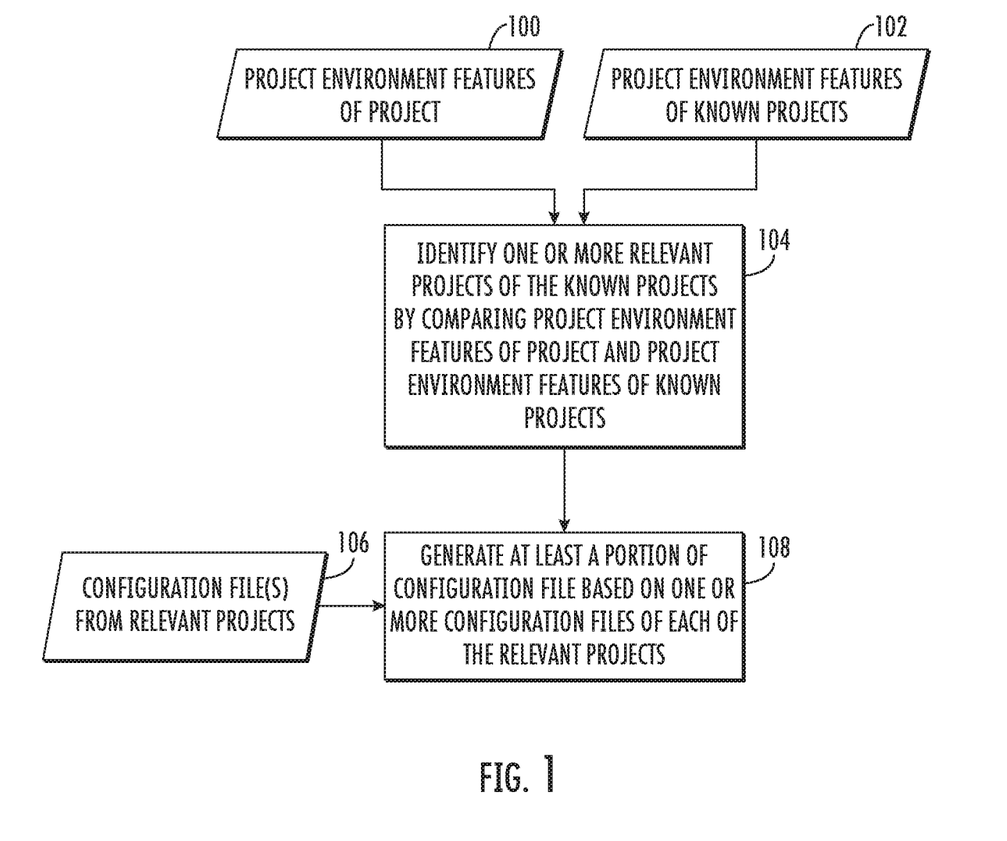
FIG. 1 is a flow diagram showing a process for automatically generating a configuration file for a project according to examples of the present disclosure.

FIG. 1 is a flow diagram illustrating a process for automatically generating at least a portion of a configuration file for a project according to one embodiment of the present disclosure. As discussed herein, a project is a collection of files associated with a software product. The software product may be a software application, a computing container configured to run one or more processes, or any other type of software product. A project may be created, edited, and in some cases built and deployed in an integrated development environment (IDE), a code editor, or the like. Configuration files for the project may specify how to build the project (e.g., an order for a compiler to process source code files for compilation), how to deploy a project (e.g., the location of a deployment server to copy one or more files to), a series of steps for creating a computing container (e.g., a list of commands to be executed within a computing container for setting up the computing container), or the like. As discussed above, configuration files have thus far been manually generated by a user. Examples of configuration files include Makefiles, Dockerfile configuration files (hereinafter "Dockerfiles" for the sake of brevity), Python configuration files (e.g., Pipenv, requirements.txt), Node.js configuration files (e.g., packages.json), Ruby configuration files, Ansible configuration files and the like.

The process in FIG. 1 starts with two inputs: project environment features of the project for which a configuration file is to be generated (block 100) and project environment features for a number of known projects (block 102). As discussed herein, project environment features are any features of an environment of a project. For example, project environment features could include a file structure of one or more files in the project, the content of one or more files in the project such as code in one or more source code files, the language of code in one or more source code files, the use of one or more modules or libraries in one or more source code files, or any other desired feature the can be extracted from the project. Details regarding how these inputs are obtained are discussed below. For purposes of the present discussion, the project environment features of the project and the project environment features of the known projects may be received from a remote source or generated locally. The known projects are pre-existing projects spanning a range of software technologies. For example, the known projects may include a number of projects meeting a set of defined criteria (e.g., minimum number of downloads, type of software product, rating, etc.) on Github, Gitlab, or the like. One or more relevant projects are identified from the known projects by comparing the project environment features of the project to the project environment features of each one of the known projects (block 104). This may involve simple matching of project environment features between the project and each one of the known projects or more advanced analysis such as machine-learning based correlation between the project environment features of the project and each one of the known projects.

As an input to the next process step, one or more configuration files from the relevant projects are provided (block 106). As discussed above, the configuration files may define settings and operational characteristics of the project. The one or more configuration files from the relevant projects are used to generate at least a portion of the configuration file for the project (block 108). Examples regarding how to generate at least a portion of the configuration file using the one or more configuration files from the relevant projects are discussed below. However, the principles of the present disclosure contemplate any suitable process for generating at least a portion of the configuration files from the one or more configuration files of the relevant projects.

Figure 2A:
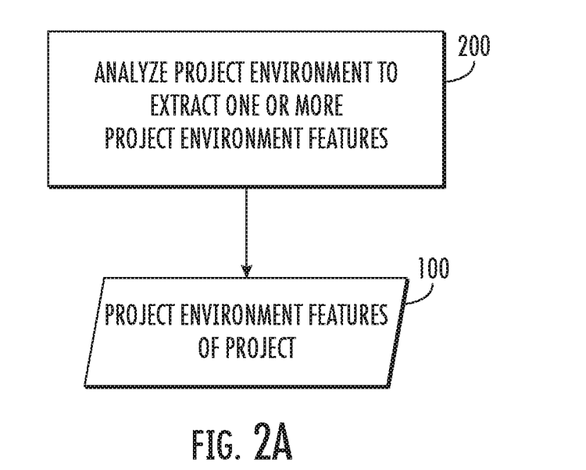
FIGS. 2A and 2B are flow diagrams illustrating details of a process for automatically generating a configuration file for a project according to examples of the present disclosure.

FIG. 2A illustrates an exemplary process for obtaining the project environment features of the project that are used as an input in block 100 of FIG. 1. In one example, the project environment of the project is analyzed to extract the one or more project environment features of the project (block 200). This may include analyzing the file structure of the files in the project, analyzing the contents of one or more files in the project, or the like. As discussed above, the project may be created, edited, and in some cases built and deployed in an IDE, a code editor, or the like. Analyzing the project environment may thus be done within the IDE, code editor, or the like, for example, by way of a software plugin for the IDE, code editor, or the like that is capable of analyzing the files in the project to extract the one or more project environment features. However, analyzing the project environment may also be performed by a software application external to the IDE, code editor, or the like in various examples.

Figure 2B:
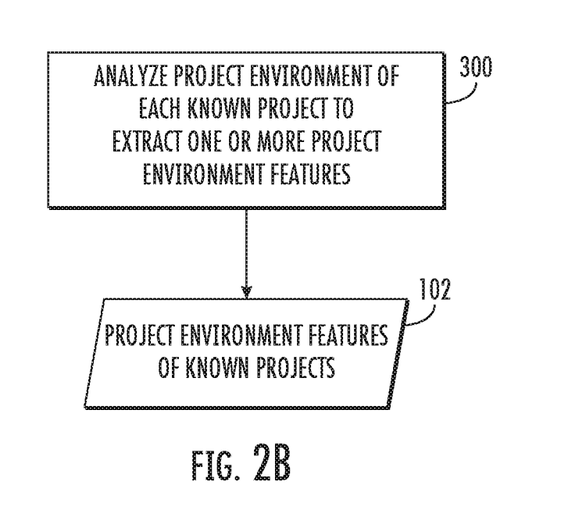

FIG. 2B illustrates an exemplary process for obtaining the project environment features of each one of the known projects that are used as an input in block 102 of FIG. 1. In one example, the project environment of each one of the known projects is analyzed to extract the one or more project environment features of each one of the known projects (block 300). This may include analyzing the file structure of the files in each one of the known projects, analyzing the contents of one or more files in each one of the known projects, or the like.

Figure 3:
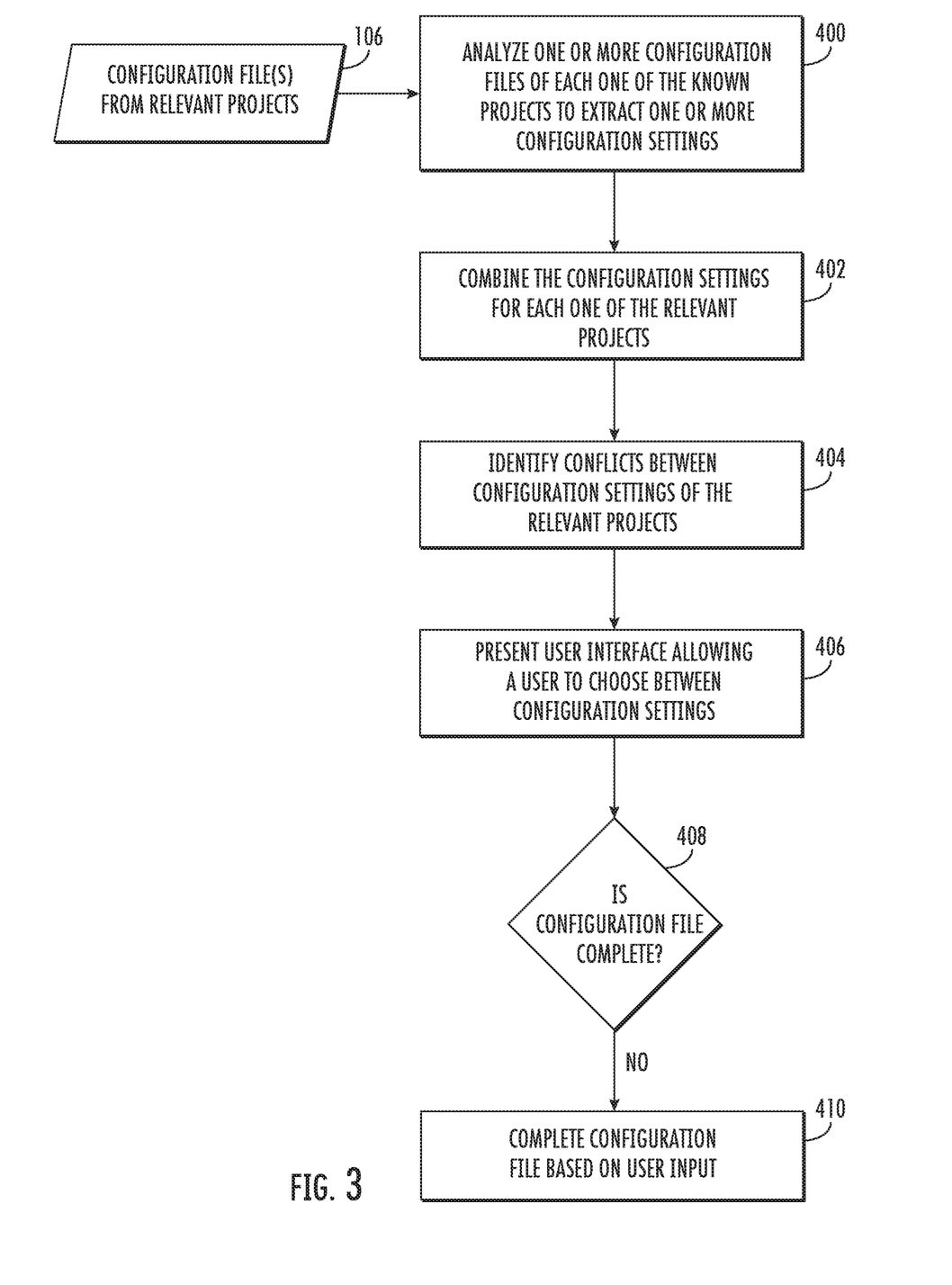
FIG. 3 is a flow diagram illustrating details of a process for automatically generating a configuration file for a project according to examples of the present disclosure.

FIG. 3 illustrates an exemplary process for generating at least a portion of the configuration file as discussed in block 108 of FIG. 1. As shown in FIG. 1, one or more configuration files from each one of the relevant projects are provided as an input (block 106). The one or more configuration files from each one of the relevant projects are analyzed to extract one or more configuration settings (block 400). A configuration file may contain any number of configuration settings. For example, in the case of a Dockerfile configuration file, the file may include configuration settings such as a "FROM" instruction, a number of "RUN" instructions, a number of "COPY" instructions, and the like. Each instruction may represent a configuration setting, which is extracted and added to a pool of configuration settings. The configuration settings extracted from each of the one or more configuration files from each one of the relevant projects are combined (block 402). Notably, the configuration settings may be combined in any number of different ways. For example, the configuration settings extracted for each relevant project may be compared and only those configuration settings that are overlapping may be combined. More advanced methods for combining the configuration settings extracted for each relevant project may also be employed.

For example, in one example the configuration settings from each relevant project are used to construct a Markov chain, which is then used to generate at least a portion of the configuration file. In other examples, other machine learning principles may be used to rank configuration settings from each relevant project, and only those configuration settings meeting a threshold are used. The present disclosure contemplates any suitable way to combine the configuration settings for each relevant project to generate at least a portion of the configuration file.

Conflicts may be identified between configuration settings from the relevant projects (block 404). Conflicts between configuration settings may include the same configuration setting with different values for a parameter of the configuration setting. In the event of a conflict between configuration settings, a user interface may be presented allowing a user to choose between the conflicting configuration settings (block 406). As discussed above, the project may be created, edited, and in some cases built and deployed in an IDE, a code editor, or the like. The user interface may thus be presented within the IDE, the code editor, or the like, as a syntax completion option or any other suitable user interface. In some examples, when there is a conflict between configuration settings a default option will be chosen and the choice will be flagged via the user interface. This may mean performing syntax highlighting or otherwise drawing attention to the default option so that a user knows that there is more than one choice for the configuration setting. In some examples, a configuration setting is not included in the configuration file generated by the process discussed with respect to FIGS. 1-3 above. However, the configuration setting may be provided as an autocompletion suggestion, for example, via Intellisense, so that the user can incorporate the configuration setting into the configuration file with minimal effort.

A determination is made whether the configuration file is complete (block 408). If the configuration file is not complete, the configuration file is completed based on user input from a user (block 410). If the configuration file is complete, the process ends.

As an example of the foregoing process, a user may create a project to generate a Docker container that hosts a web server. The project may include one or more source code files including code written in Python for providing the functionality of the web server. One or more project environment features may be indicative of these aspects of the project. For example, an empty Dockerfile may indicate that the project is intended to create a Docker container. The source code files may import Python modules indicating that they create a web server. These project environment features may be compared to project environment features of a number of known projects. The known projects may include projects that generate a Docker container and host a Python web server, and thus those known projects will be deemed relevant projects. Configuration files, which in the present example may be limited to Dockerfiles, in each one of the relevant projects may be analyzed to extract configuration settings. The configuration settings may be combined as discussed above to create at least part of a Dockerfile for the project. The Dockerfile may include, for example, the installation of Python, the installation of one or more Python modules to provide the web server functionality, and the like. Settings such as an open port number for providing the web server may conflict between the relevant projects and thus this may be flagged for review and selection by the user.

Figure 4:
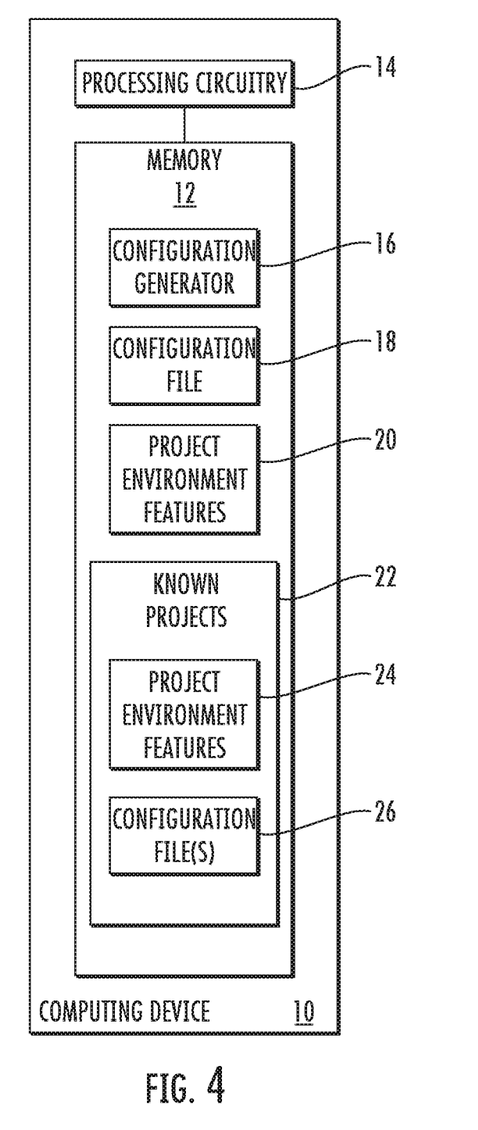
FIG. 4 is a block diagram illustrating a computing device for automatically generating a configuration file for a project according to examples of the present disclosure.

FIG. 4 is a block diagram of a computing device 10 suitable for implementing the examples discussed herein. The computing device 10 includes a memory 12 and processing circuitry 14 coupled to the memory 12. The memory 12 includes instructions, which when executed by the processing circuitry 14 cause the computing device 10 to implement the examples discussed above. In particular, the memory 12 includes instructions to provide a configuration generator 16 to generate at least a portion of a configuration file 18 for a project as discussed herein. The configuration generator 16 may be run as a standalone software application, run within a computing container, run as a server service such as a language server extension for an IDE or code editor, or the like. As discussed above, to generate at least the portion of the configuration file 18, the configuration generator 16 may receive one or more project environment features 20 of the project. Further, the configuration generator 16 may identify one or more relevant projects from a plurality of known projects 22 based on one or more project environment features 24 of each one of the plurality of known projects 22, and may generate the at least portion of the configuration file 18 based on one or more configuration files 26 from each of the one or more relevant projects in the plurality of known projects 22. Accordingly, the one or more project environment features 20, the plurality of known projects 22, the one or more project environment features of each one of the plurality of known projects 22, and the one or more configuration files 26 from each relevant project of the plurality of known projects 22 are shown in the memory 12. Any or all of the information necessary to generate the at least portion of the configuration file 18 may be stored in any desired type of data structure in the memory 12.

Figure 5:
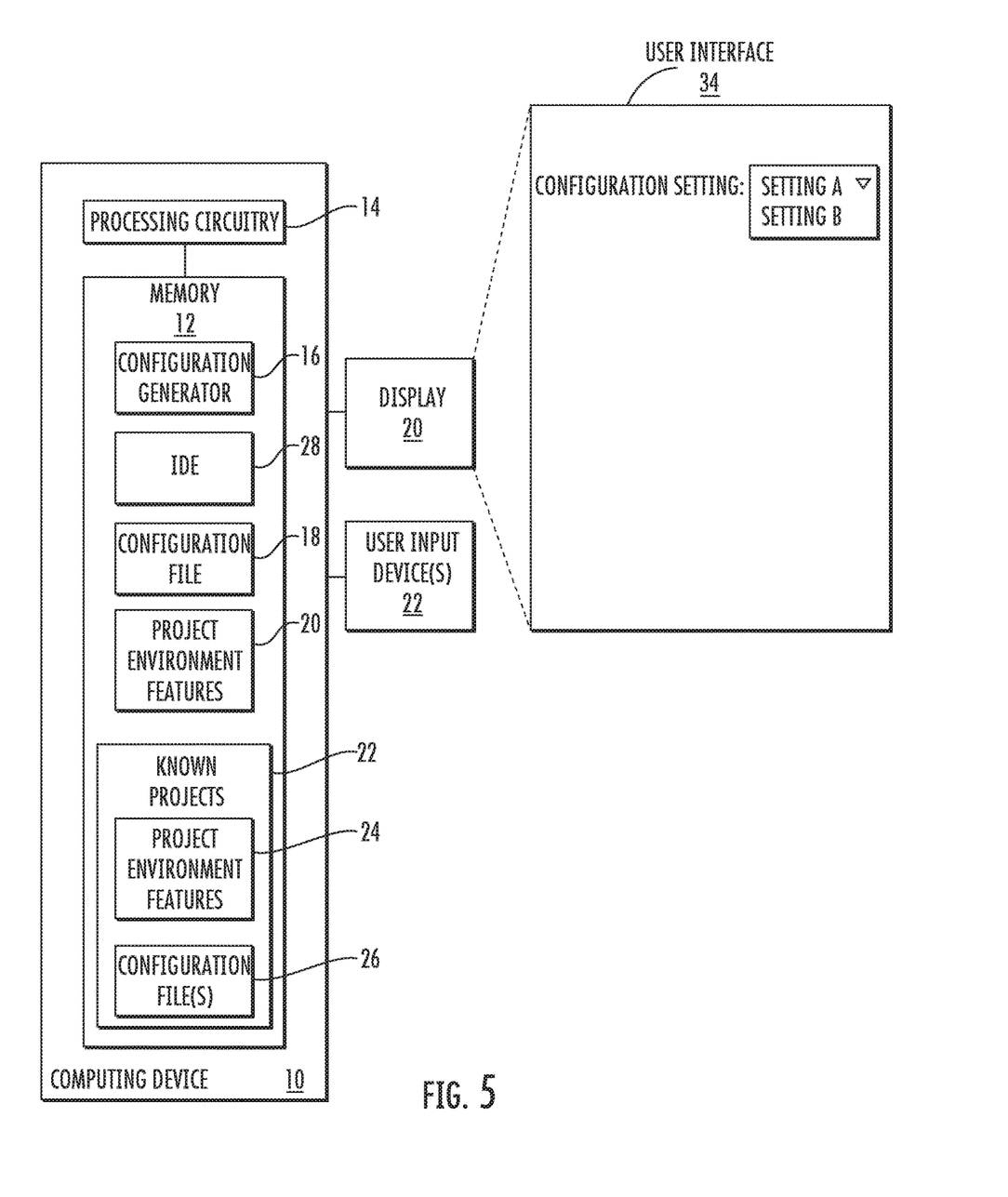
FIG. 5 is a block diagram illustrating a computing device for automatically generating a configuration file for a project according to examples of the present disclosure.

As discussed above, the project may be created, edited, and in some cases built and deployed in an IDE, a code editor, or the like. FIG. 5 thus shows the computing device 10 wherein an IDE 28 and the configuration generator 16 are both stored in the memory 12 and thus executed on the computing device. The configuration generator 16 may communicate with the IDE 28 to extract the one or more project environment features 20 of the project by a plugin or any other suitable process. As discussed above, the configuration generator 16 may generate at least a portion of the configuration file 18 based on one or more configuration files 26 from identified relevant projects from a plurality of known projects 22, and specifically by comparing the one or more project environment features 20 with one or more project environment features 24 of each of the known projects 22. Further, the configuration generator 16 may communicate with the IDE 28 to provide at least a portion of the configuration file 18 as a language server extension. The computing device 10 may be coupled to a display 30 and one or more user input devices 32. A user may interact with the IDE 28 to update or otherwise complete the configuration file as discussed above. As discussed above, in some situations conflicting settings from the one or more configuration files 26 of the relevant ones of the known projects 22 may exist. In these situations, a user interface 34 may be presented allowing a user to choose between the conflicting settings. The exemplary user interface 34 may be generated by the IDE 28 in the form of a code completion hint or Intellisense pop-over.

In some examples, the configuration generator 16 may be provided in a separate computing device than the IDE 28.

Figure 6:
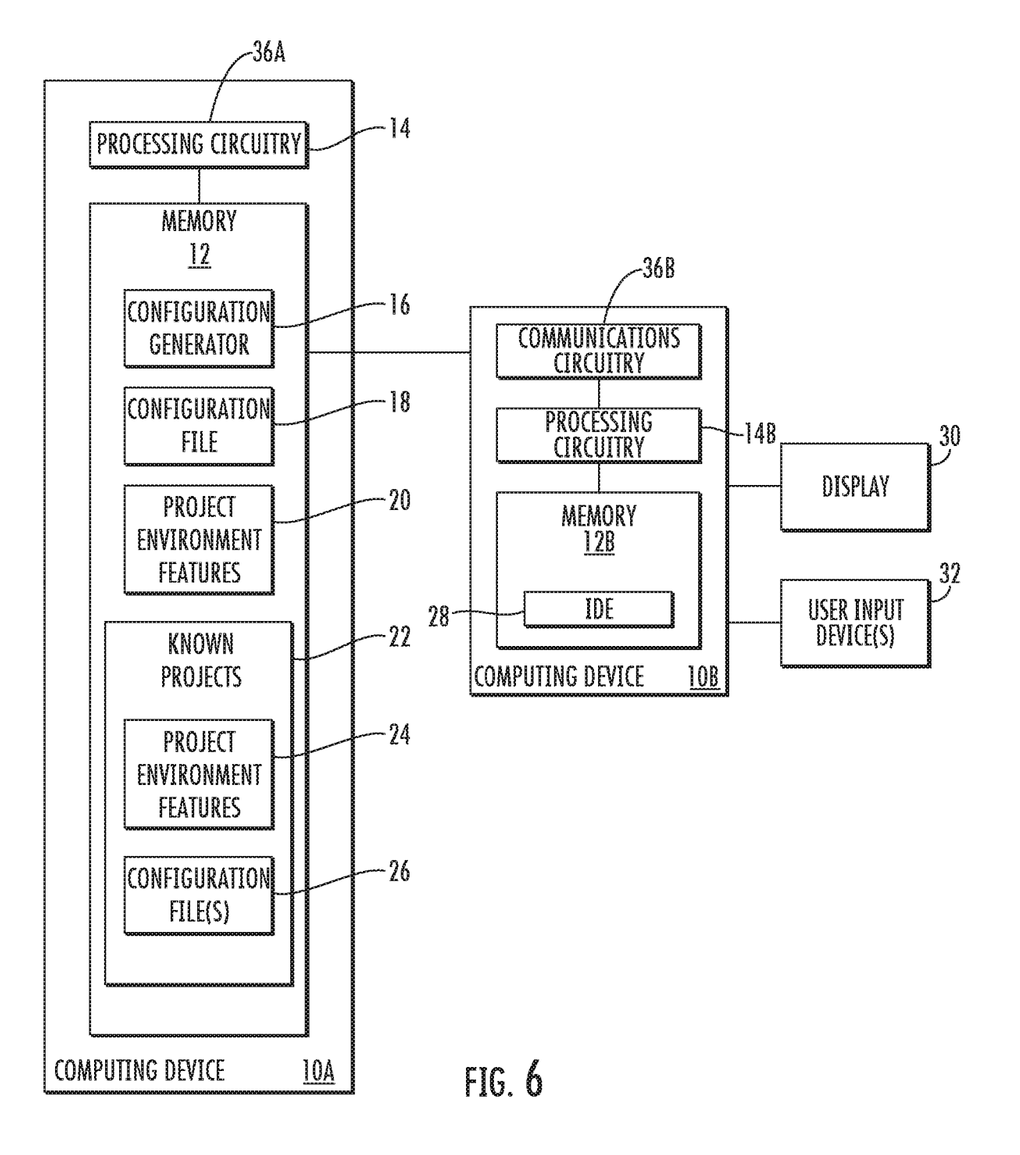
FIG. 6 is a block diagram illustrating a computing environment for automatically generating a configuration file for a project according to examples of the present disclosure.

Accordingly, FIG. 6 shows a first computing device 10A including a memory 12A, processing circuitry 14A, and communications circuitry 36A. The memory 12A stores instructions for the configuration generator 16. A second computing device 10B includes a memory 12B, processing circuitry 14B, and communications circuitry 36B. The memory 12B stores instructions for the IDE 28. The second computing device 10B is coupled to the display 30 and the one or more user input devices 32. The first computing device 10A and the second computing device 10B communicate via their respective communications circuitry 36 so that the configuration generator 16 can interact with the IDE 28 to generate at least a portion of the configuration file as discussed above.

Figure 7:
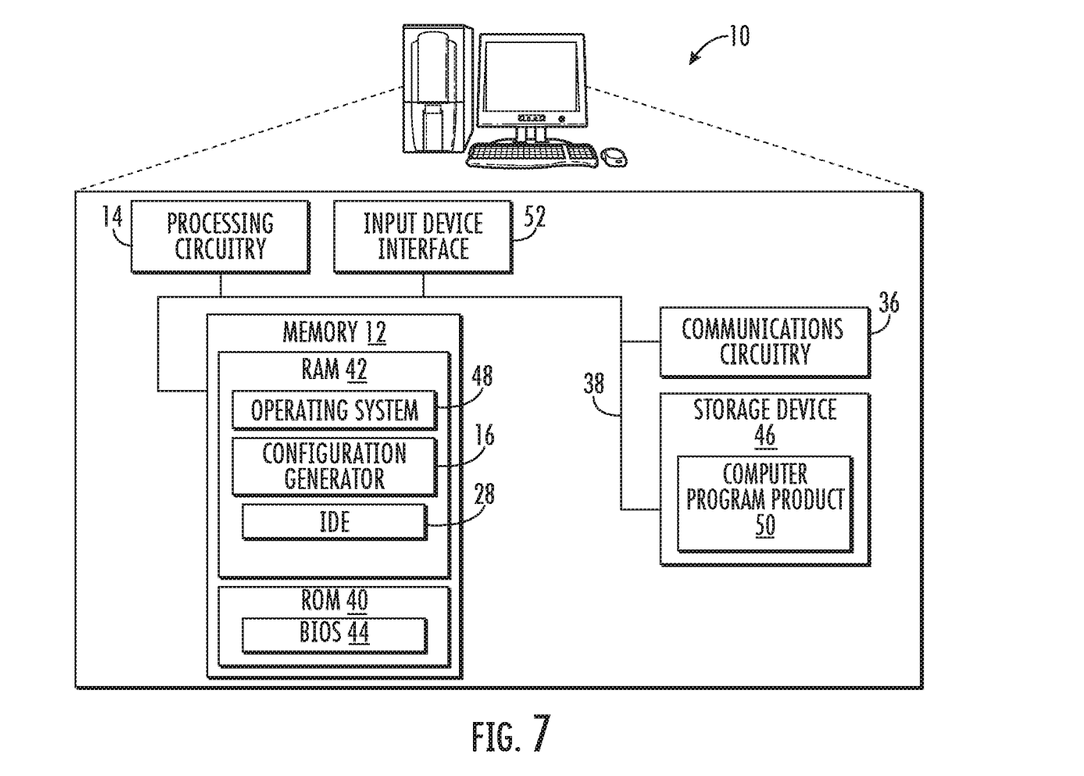
FIG. 7 is a block diagram of a computing device for automatically generating a configuration file for a project according to examples of the present disclosure.

FIG. 7 is a block diagram of the computing device 10 suitable for implementing examples according to one example. The computing device 10 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 10 includes the processing circuitry 14, the memory 12, and a system bus 38. The system bus 38 provides an interface for system components including, but not limited to, the memory 12 and the processing circuitry 14. The processing circuitry 14 can be any commercially available or proprietary processor.

The system bus 38 may be any of several types of bus structures that may further interconnect to a memory bus (with or without a memory controller), a peripheral bus, and/or a local bus using any of a variety of commercially available bus architectures. The memory 12 may include non-volatile memory 40 (e.g., read-only memory (ROM), erasable programmable read-only memory (EPROM), electrically erasable programmable read-only memory (EEPROM), etc.), and volatile memory 42 (e.g., random-access memory (RAM)). A basic input/output system (BIOS) 44 may be stored in the non-volatile memory 40 and can include the basic routines that help to transfer information between elements within the computing device 10. The volatile memory 42 may also include a high-speed RAM, such as static RAM, for caching data.

The computing device 10 may further include or be coupled to a non-transitory computer-readable storage medium such as a storage device 46, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 46 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 46 and in the volatile memory 42, including an operating system 48 and one or more program modules, such as the configuration generator 16 and the IDE 28, which may implement the functionality described herein in whole or in part. It is to be appreciated that the examples can be implemented with various commercially available operating systems 48 or combinations of operating systems 48.

A number of modules can be stored in the storage device 46 and in the volatile memory 42, including, by way of non-limiting example, the configuration generator 16 and the IDE 28. All or a portion of the examples may be implemented as a computer program product 50 stored on a transitory or non-transitory computer-usable or computer-readable storage medium, such as the storage device 46, which includes complex programming instructions, such as complex computer-readable program code, to cause the processing circuitry 14 to carry out the steps described herein. Thus, the computer-readable program code can comprise software instructions for implementing the functionality of the examples described herein when executed on the processing circuitry 14. The processing circuitry 14, in conjunction with the configuration generator 16 and the IDE 28 in the volatile memory 42, may serve as a controller, or control system, for the computing device 10 that is to implement the functionality described herein.

An operator, such as a user, may also be able to enter one or more configuration commands through the user input devices 32 such as a keyboard (not illustrated), a pointing device such as a mouse (not illustrated), or a touch-sensitive surface such as the display 30. Such input devices may be connected to the processing circuitry 14 through an input device interface 52 that is coupled to the system bus 38 but can be connected by other interfaces such as a parallel port, an Institute of Electrical and Electronic Engineers (IEEE) 1394 serial port, a Universal Serial Bus (USB) port, an IR interface, and the like.

The computing device 10 may also include the communications circuitry 36 suitable for communicating with a network as appropriate or desired. The computing device 10 may also include a video port configured to interface with the display 30, to provide information to the user.

Individuals will recognize improvements and modifications to the preferred examples of the disclosure. All such improvements and modifications are considered within the scope of the concepts disclosed herein and the claims that follow.

What is claimed is:

1. A method comprising:
   receiving one or more project environment features of a project;
   automatically identifying one or more relevant projects from a plurality of known projects by comparing the one or more project environment features of the project to one or more project environment features of each of the plurality of known projects; and
   automatically generating at least a portion of a configuration file based on one or more configuration files from each of the one or more relevant projects.

2. The method of claim 1 wherein the one or more project environment features of the project comprise a file structure of one or more files in the project.

3. The method of claim 1 wherein the one or more project environment features of the project comprise code in one or more source code files in the project.

4. The method of claim 1 wherein the one or more project environment features of the project comprise a language of code in one or more source code files in the project.

5. The method of claim 1 wherein the one or more project environment features of the project comprise the use of one or more code modules in one or more source code files in the project.

6. The method of claim 1 wherein the configuration file comprises a Dockerfile, and further comprising:
analyzing each one of the plurality of known projects to extract the one or more project environment features of each of the plurality of known projects; and
analyzing one or more Dockerfiles associated with each one of the plurality of known projects to extract one or more configuration settings from each one of the plurality of known projects.

7. The method of claim 6 wherein generating at least the portion of the configuration file comprises combining the one or more configuration settings from each of the one or more relevant projects into the configuration file.

8. The method of claim 7 wherein:
the one or more configuration settings comprise a plurality of configuration settings; and
the method further comprises:
identifying one or more conflicts between at least two of the plurality of configuration settings; and
in response to identifying a conflict between the at least two of the plurality of configuration settings, presenting a user interface allowing a user to choose between the at least two of the plurality of configuration settings.

9. The method of claim 1 wherein the configuration file is one of a Makefile, a Dockerfile, a Python configuration file, a Node.js configuration file, a Ruby configuration file, and an Ansible configuration file.

10. The method of claim 1 further comprising analyzing a project environment of the project to extract the one or more project environment features.

11. The method of claim 1 wherein:
the one or more project environment features of the project are received from a code editor; and
the method further comprises providing the portion of the configuration file to the code editor.

12. The method of claim 1 wherein receiving the one or more project environment features of the project, identifying the one or more relevant projects from the plurality of known projects, and generating at least the portion of the configuration file are performed by a language server configured to communicate via a language server protocol with a code editor.

13. The method of claim 1 further comprising determining if the configuration file is a complete configuration file.

14. The method of claim 13 further comprising, in response to determining that the configuration file is not a complete configuration file, completing the configuration file based on user input from a user.

15. A computing device, comprising:
a memory; and
a processor coupled to the memory and configured to:
receive one or more project environment features of a project;
automatically identify one or more relevant projects from a plurality of known projects by comparing the one or more project environment features of the project to one or more project environment features of each of the plurality of known projects; and
automatically generate at least a portion of a configuration file for the project based on one or more configuration files from each of the one or more relevant projects.

16. The computing device of claim 15 wherein the one or more project environment features of the project comprise one or more of:
a file structure of one or more files in the project;
code in one or more source code files in the project; and
the use of one or more code modules in one or more source code files in the project.

17. The computing device of claim 15 wherein the processor is further configured to:
analyze each one of the plurality of known projects to extract the one or more project environment features of each of the plurality of known projects; and
analyze one or more configuration files associated with each one of the plurality of known projects to extract one or more configuration settings from each one of the plurality of known projects.

18. The computing device of claim 17 wherein generating at least the portion of the configuration file comprises combining the one or more configuration settings from each of the one or more relevant projects into the configuration file.

19. The computing device of claim 18 wherein:
the one or more configuration settings comprise a plurality of configuration settings; and
the processor is further configured to:
identify one or more conflicts between at least two of the plurality of configuration settings; and
in response to identifying a conflict between the at least two of the plurality of configuration settings, present a user interface allowing a user to choose between the at least two of the plurality of configuration settings.

20. A computer program product comprising a non-transitory computer-readable storage medium and including instructions to cause a processor to:
receive one or more project environment features of a project;
automatically identify one or more relevant projects from a plurality of known projects by comparing the one or more project environment features of the project to one or more project environment features of each of the plurality of known projects; and
automatically generate at least a portion of a configuration file based on one or more configuration files from each of the one or more relevant projects.

* * * * *